United States Patent [19]

Saito

[11] Patent Number: 4,460,426
[45] Date of Patent: Jul. 17, 1984

[54] COMPOSITE PAPER SHEETS ADAPTED TO MANUFACTURE BAGS AND PROCESS

[75] Inventor: Akio Saito, Tokyo, Japan

[73] Assignee: Showa Seitai Kogyo Kaisha Ltd., Tokyo, Japan

[21] Appl. No.: 268,148

[22] Filed: May 29, 1981

[30] Foreign Application Priority Data

Jun. 6, 1980 [JP] Japan ................................. 55-75422
Dec. 5, 1980 [JP] Japan ............................... 55-170852

[51] Int. Cl.³ ........................................... B32B 31/00
[52] U.S. Cl. .................................... 156/277; 156/291; 427/286; 427/288; 428/198; 428/211; 428/535
[58] Field of Search ............... 428/195, 198, 207, 211, 428/537, 343, 354, 535; 156/277; 427/286, 288

[56] References Cited

U.S. PATENT DOCUMENTS

| | | | |
|---|---|---|---|
| 3,055,496 | 9/1962 | Dunlap | 428/343 |
| 3,373,090 | 3/1968 | Alden | 428/343 |
| 3,515,270 | 6/1970 | Tonn et al. | 428/343 |
| 3,881,041 | 4/1975 | Glienke | 428/47 |
| 4,115,602 | 9/1978 | Bullard | 428/211 |
| 4,260,443 | 4/1981 | Lindsay et al. | 428/198 |
| 4,354,890 | 10/1982 | Maffey | 428/198 |

Primary Examiner—James J. Bell
Attorney, Agent, or Firm—Wenderoth, Lind & Ponack

[57] ABSTRACT

At least one surface of a paper sheet of a composite paper sheet utilized to form bags is printed with a printing ink type binder. The binder is printed in the form of parallel spaced stripes extending in parallel with or crossing at a predetermined angle with respect to the longitudinal direction of the composite sheet. After printing, the composite sheet is wrapped into a roll. Then, the printed binder bonds adjacent paper sheets together to form the composite sheet. The binder can be applied with conventional printing press.

4 Claims, 10 Drawing Figures

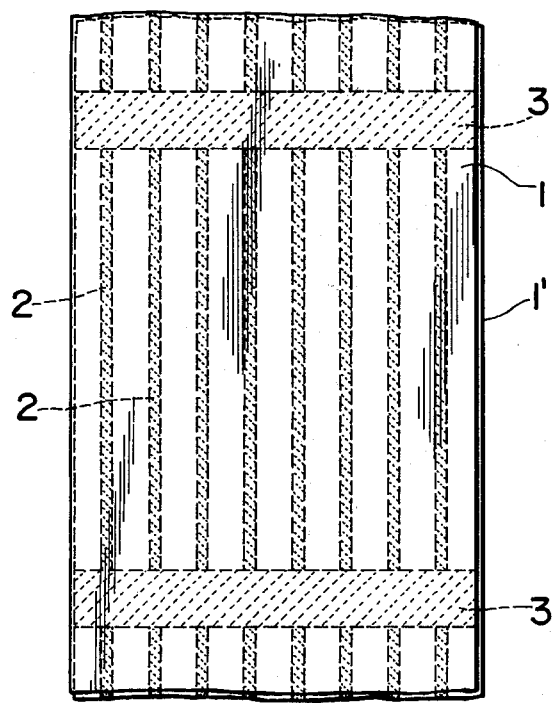
FIG_1
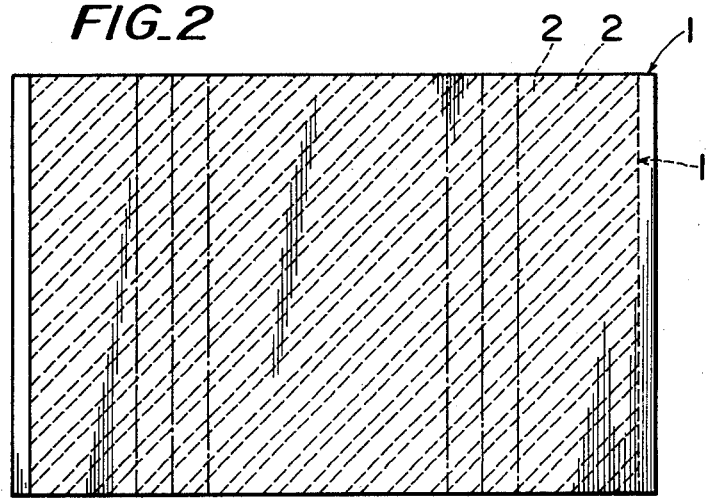
FIG_2

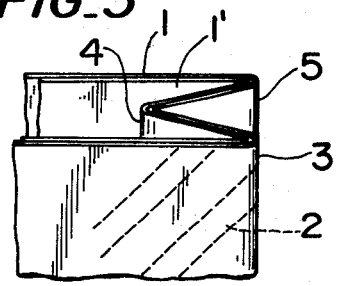
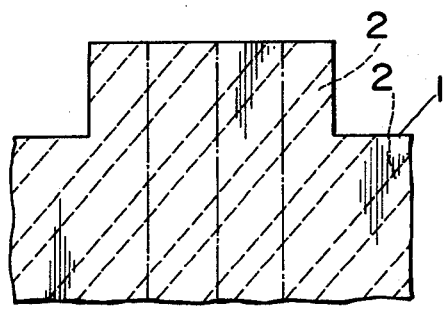 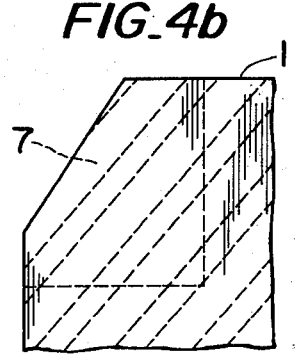
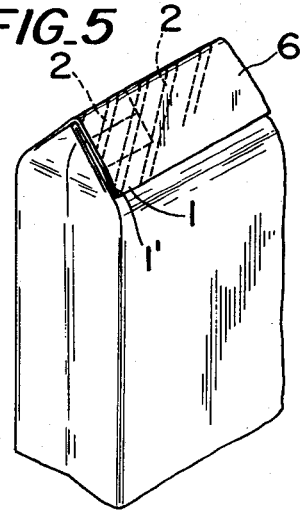

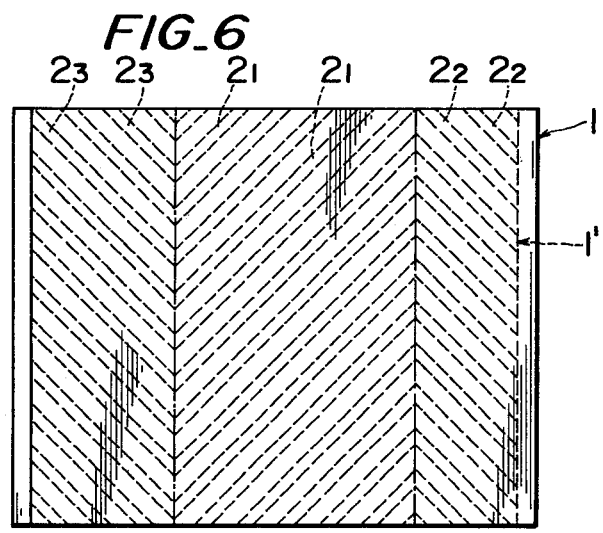
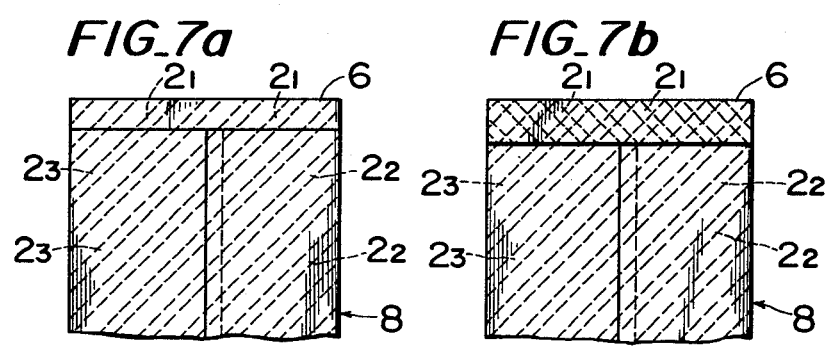
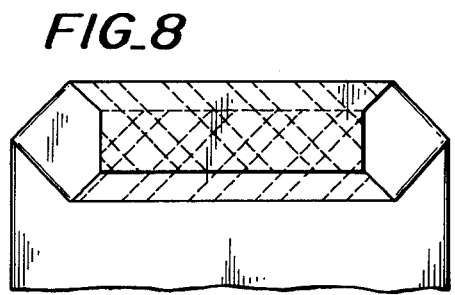

COMPOSITE PAPER SHEETS ADAPTED TO MANUFACTURE BAGS AND PROCESS

BACKGROUND OF THE INVENTION

This invention relates to a composite paper sheet adapted to manufacture bags and prepared by bonding together such sheets of paper as craft paper, extensible paper or the like.

Bags for accommodating such heavy materials as cement, provender, flour, etc. are generally prepared by laminating several sheets of strong paper such as craft paper. Since the price of raw material chips for manufacturing craft paper is increasing in recent years, bag manufacturers are endeavouring to reduce the number of paper sheets to be laminated, for example, from three to two.

Top open type bags are generally used because of their high packing efficiency. During packing, the bags are maintained vertically so that the bags must have some degree of rigidity and a high impact strength. Bags having low rigidity made of such extensible paper as Clupak (Clupak Co., United States) can meet the requirement of reducing the number of sheets but are difficult to handle so that they are not suitable for this purpose.

My experiments show that bags comprising two layers of 83 g/m$^2$ Clupak have a drop strength comparable with the bags comprising three layers of craft paper.

Where bags are made of laminated polyethylene sandwich paper sheets (Craft/PE/Craft) sheets as is the common practice, the bags have a rigidity sufficient to be held upright, but their manufacturing cost increases, which decreases the advantage of light weight. Although such bags can be made to have sufficient rigidity when their entire surfaces are bonded together with a binder, their pliability is decreased thereby decreasing drop shock resistance so that such bags are not practically used. Moreover, since resinous binder is used, the percentage of paper which can be recovered is small, and when used bags are burnt, they generate a large quantity of smoke containing harmful components.

SUMMARY OF THE INVENTION

Accordingly, it is an object of the invention to provide a composite paper sheet made of relatively pliable paper but which has sufficient rigidity to hold a bag made of the composite sheet in a upright position to pour material into the bag.

Another object of this invention is to provide a composite paper sheet that can be prepared with a conventional rotary press at a low cost and which is suitable to manufacture bags to be packed with relatively heavy materials.

Still another object of this invention is to provide a novel composite paper sheet especially suitable for manufacturing bags with opening and bottom portions which are reinforced.

According to this invention there is provided a composite paper sheet adapted to form a bag comprising at least two superposed and bonded sheets of paper, at least one of the confronting surfaces of the bonded sheets of paper being printed with a printing ink type binder.

Although the binder may be applied over the entire surface of one sheet of paper, it is advantageous to apply it in the form of spaced parallel stripes extending in parallel with or inclined at a predetermined angle with respect to the longitudinal direction of the composite sheet. The last mentioned pattern of the binder reinforces the opening and bottom portions of the bag.

BRIEF DESCRIPTION OF THE DRAWINGS

In the accompanying drawings:

FIG. 1 is a plan view showing a portion of a composite paper sheet embodying the invention;

FIG. 2 is a plan view showing a portion of a composite paper sheet printed with parallel stripes inclined with respect to the longitudinal direction of the composite sheet;

FIG. 3 is a perspective view of the portion of the composite sheet shown in FIG. 2 after folding the same to form a bag;

FIGS. 4a and 4b show steps of manufacturing a bag having a blow valve by using the printed composite sheet shown in FIG. 2;

FIG. 5 is a perspective view of a bag made of a printed composite sheet shown in FIG. 2 and formed with an upper flap;

FIG. 6 is a plan view showing a portion of the composite paper sheet printed with a printing ink type binder of a pattern different from that shown in FIG. 2;

FIGS. 7a and 7b show opening and bottom portions of a bag formed with the printed composite paper sheet shown in FIG. 6; and FIG. 8 is a plan view of the bottom of a bag formed by using the printed composite paper sheet shown in FIG. 6.

DESCRIPTION OF THE PREFERRED EMBODIMENTS

I have found that when sheets of paper are partially bonded, in the form of stripes in parallel or obliquely with respect to the longitudinal direction of the paper sheets, it is possible to obtain a composite paper sheet especially suitable for manufacturing bags having satisfactory rigidity and drop strength.

A composite or laminated sheet of paper is usually prepared by interposing a molten binder between paper sheets and then taking up the sheets into a roll thereby bonding the sheets together. With this method, two sheets are integrated into a single sheet or layer so that when subjected to a percussive force the two sheets are severed simultaneously indicating a low mechanical strength.

Where a multilayered bag is prepared by using a special extensible paper, for example extensible paper described above for the purpose of alleviating impact at the time of dropping the bag, the extensive characteristic of the paper is lost, thus causing breakage of the bag.

Moreover, as above described, the percentage of recovery of the paper component is low, and when the used bags are burnt they generate a large quantity of harmful smoke.

The binder increases the overall thickness of the composite paper sheet, which increases the diameter of the taken up roll.

To solve this problem, it has been proposed to use a water soluble binder. However, when such a water soluble binder is used it is necessary to install a drying device for the purpose of removing the water content before taking up the laminated sheets into a roll, such drying device not only consuming heat energy but also increasing the manufacturing cost. Such problems also occur in a case where a molten binder is used.

Bags are usually manufactured by paying out a long web of the composite sheet from a roll, deforming the flat composite sheet into a cylinder, and then cutting the cylinder into sections having a length of one bag. In this case, the binder is applied to only a portion of the composite sheet where bottom and opening portions are formed later.

In order to facilitate packing of a material into the bag, all layers of the composite sheet are required to be integrally bonded along the entire periphery of the opening, but according to the method of applying the binder described above such integral bonding is difficult.

The composite paper sheet of this invention is prepared by printing a printing ink type binder onto at least one surface of opposing sheets of paper, and laminating the sheets so as to bond them together under pressure. The composite paper sheet thus prepared is wound into a roll for use in a continuous bag manufacturing machine.

Although the printing ink type binder may be applied to the entire surface of a paper sheet it is advantageous to apply it as stripes in parallel with or oblique to the longitudinal direction of the sheet.

The thickness of the printed composite paper sheet is substantially uniform, and since the thickness of the printed ink type binder is negligibly small, the diameter of the roll would not be increased over that of a roll utilizing a conventional binder. Moreover, as the quantity of the printing ink type binder is small, a higher percentage of the paper component contained in used bags can be recovered, and when used bags are burnt, the quantity of harmful smoke or gas is small.

The sheet of paper may be a conventional craft paper, elongatable paper such as Clupak, or synthetic paper.

The printing ink type binder may be an ordinary printing ink. Generally, a conventional printing ink comprises a composition consisting of a coloring agent such as a pigment or dye, a vehicle consisting of an artificial resin, a natural resin and cellulose, and an additive consisting of varnish, dryer, toner and Victoria.

Since, in this invention, the printing ink is not used to color the sheets, the pigment or dye may be omitted. Since the cost of pigment or dye amounts to about one half of the cost of the printing ink, elimination thereof greatly reduces the cost of the printing ink. However, use of a small quantity of pigment or dye is advantageous in that colored printed ink shows nonuniform or discontinuous printing.

My experiment shows that an oil base printing ink in which the quantity of the pigment or dye is greatly reduced, or is zero, gives a satisfactory result.

Although an ordinary printing ink should not adhere to other printed paper, the printing ink of this invention should have a high adhesiveness.

Some characteristics of the printing ink type binder which show satisfactory results are illustrated in the following:

| | |
|---|---|
| inkometer value (250° C., 400 rpm) | 8.0–11.0 |
| measured viscosity of parallel plates (25° C., 1 flow value) | 36.0–40.0 |
| slope value | 5.0–8.0 |
| viscosity by Raleigh type viscosimeter (25° C., poise) | 100–200 |
| surface drying time (25° C.) | more than 2 hrs. |
| film drying time (25° C.) | more than 3 hrs. |

As above described, according to this invention, one paper sheet is pressed against the printed surface of the other paper sheet and the laminated sheets are maintained for a suitable time under pressure. Preferably, after lamination, the composite sheet is wrapped into a coil. To assure better bonding a suitable pressure should be applied to wrapped turns of the roll. The result of many experiments shows that the following method gives a better result than a conventional method of forming a roll in which the composite sheet is wrapped about a rotating mandrel. Thus, a take up roller is mounted on two rotating rollers, for example, the composite sheet is guided to the take up roller about the periphery of one rotating roller to wrap the composite sheet about the take up roller under a constant pressure and a constant tension.

It is considered that the bonding of two laminated paper sheets is effected by oxidation polymerization of the surface of the printed ink. It is possible to print on the opposing surfaces of the adjacent paper sheets.

Since a factory of a paper bag manufacturing plant is usually provided with several rotary presses the composite paper sheet of this invention can be readily manufactured with present machines by merely adding a support for rotatably supporting a roll of a composite paper sheet to be bonded to a printed paper sheet.

Cutting lines may be printed at the time of printing a predetermined pattern.

The invention can be more fully understood from the following examples.

EXAMPLE 1

In this example, as shown in FIG. 1, parallel stripes 2 extending in the longitudinal direction of sheets of paper 1 and 1' each having a width of 1010 mm, and each stripe having a width of 15 mm and a lateral spacing of 30 mm, and transverse stripes 3 longitudinally spaced by the length of bags, are continuously printed on one surface of the sheet 1 by using a rotary press and a printing ink of the type described above. Then the printed sheets of paper were wrapped about a rotating mandrel to form a roll.

Even when the diameter of the roll is 1000 mm, the difference in the diameters between rolls was extremely small, so that there was no trouble in the formation of the rolls.

After leaving the roll standing for 24 hours, it was found that adjacent layers of the wrapped sheets were firmly bonded together by the applied printing ink to withstand against forces applied thereto during succeeding bag manufacturing steps.

Bags prepared with this composite paper sheet were found to have the same or larger mechanical strength than those prepared by using composite sheets using a conventional binder. Furthermore, the bags prepared by using the composite paper sheet of this invention can stand upright with their openings sufficiently opened.

In the following examples parallel spaced stripes are printed obliquely with respect to the longitudinal direction of the sheets of paper.

EXAMPLE 2

As shown in FIG. 2, parallel stripes 2 each having a width of 15 mm and spaced from each other by 30 mm were printed obliquely at an angle of 30° with respect to the longitudinal direction. In this example, since both side edges of the sheets of paper 1 and 1' are overlapped and then bonded to form a cylindrical member, stripes 2 are not printed on these side edges.

Other steps of wrapping the printed composite sheet into a roll, paying out the composite sheet from the roll and cutting the payed-out sheet into sections are the same as those of Example 1.

Where a bag is formed by folding the printed composite sheet along dot and dash lines shown in FIG. 2, as the printed stripes 2 uniformly cross the folds 3, 4 and 5 as shown in FIG. 3 it is easy to fold the composite sheet at correct positions. In Example 1 in which the printed stripes extend in the longitudinal direction the folds may often coincide with the stripes where the rigidity is large.

Where a bag having a blow valve 7 as shown in FIGS. 4a and 4b is formed with the printed composite sheet of this example, as the printed stripes 2 evenly cross the folds, portions folded into the bag are difficult to return back to the outside.

Where the printed composite sheet shown in FIG. 2 is used to form a bag with its upper or bottom flap bent and bonded as shown in FIG. 5, as both sides of the flap are bonded by the printed stripes, both side edges of the sheets of paper 1 and 1' will not peel away.

When the printed composite sheet is wrapped into a roll, since the printed stripes are successively displaced from each other by a small amount between adjacent turns, the diameter of the roll becomes more uniform throughout the length of the roll than a roll of a composite sheet printed with parallel longitudinal stripes.

EXAMPLE 3

In this example, as shown in FIG. 6 stripes $2_1$, $2_2$ and $2_3$ are printed on the surfaces of the sheets of paper 1 and 1' which become the front and rear surfaces of a bag to be formed later. Stripes $2_2$, $2_3$ and $2_1$ incline in the opposite directions each at an angle of 45° with respect to the longitudinal direction of the composite sheet.

Where a bag is formed of the composite sheet shown in FIG. 6 and when a flap 6 is bent and bonded to the upper opening or to the bottom of the bag as shown in FIGS. 7a and 7b, the inclined stripes printed on the flap 6 and those printed on the main body of the bag to which the flap is bonded will cross each other, thus reinforcing the opening and bottom portions of the bag. Also, where a bag having a hexagonal bottom as shown in FIG. 8 is formed by using the composite sheet shown in FIG. 6, the printed stripes at the bottom portion cross each other, so that the mechanical strength of the bottom can be improved.

In each example, 24 hours after bonding the paper layers to form a composite sheet, bondings of sufficient strength are formed. As a consequence the composite paper sheet of this invention can be used to form bags in the same manner as a single paper sheet.

What is claimed is:

1. A process for preparing a composite paper sheet, which comprises:
    printing an oxidatively polymerizable oil base printing ink on less than an entire surface of a first paper sheet,
    superposing a second paper sheet on the printed surface of said first paper sheet,
    wrapping said first and second paper sheets into a roll, thereby applying pressure to the wrapped turns of said sheets, and
    holding said roll for at least 24 hours to effect oxidative polymerization of said printing ink and thus bond said first and second paper sheets to each other.

2. The process according to claim 1 wherein said printing ink is printed in the form of parallel spaced stripes extending in the longitudinal direction of said sheets.

3. The process according to claim 1 wherein said printing ink is printed in the form of parallel spaced stripes inclined at a predetermined angle with respect to the longitudinal direction of said sheets.

4. The process according to claim 3 wherein said stripes of printing ink incline in opposite directions on portions of said composite paper sheet which become outer and inner surfaces respectively of a bag formed with said composite paper sheet.

* * * * *